(12) United States Patent
Inoue et al.

(10) Patent No.: US 8,213,703 B2
(45) Date of Patent: Jul. 3, 2012

(54) METHOD AND APPARATUS FOR REVIEWING DEFECTS ON MASK

(75) Inventors: Takafumi Inoue, Kanagawa (JP); Masanori Sugino, Kanagawa (JP)

(73) Assignee: NuFlare Technology, Inc., Numazu-shi (JP)

( * ) Notice: Subject to any disclaimer, the term of this patent is extended or adjusted under 35 U.S.C. 154(b) by 485 days.

(21) Appl. No.: 12/564,258

(22) Filed: Sep. 22, 2009

(65) Prior Publication Data

US 2010/0098322 A1  Apr. 22, 2010

(30) Foreign Application Priority Data

Oct. 20, 2008 (JP) ................. 2008-269469

(51) Int. Cl.
*G06K 9/00* (2006.01)
(52) U.S. Cl. ....................... 382/144
(58) Field of Classification Search ........... 382/144
See application file for complete search history.

(56) References Cited

U.S. PATENT DOCUMENTS

| 7,415,149 B2 | 8/2008 | Tsuchiya et al. |
| 7,692,144 B2 * | 4/2010 | Watanabe et al. ........... 250/307 |
| 2005/0142455 A1 * | 6/2005 | Ando ................. 430/5 |
| 2006/0078188 A1 | 4/2006 | Kurihara et al. |
| 2006/0270072 A1 | 11/2006 | Ikenaga et al. |

FOREIGN PATENT DOCUMENTS

| JP | 61-210390 | 9/1986 |
| JP | 2005-134347 | 5/2005 |
| JP | 2006-98153 | 4/2006 |
| JP | 2008-82740 | 4/2008 |

OTHER PUBLICATIONS

Office Action issued Sep. 30, 2010, in Japanese Patent application No. 2008-269469 with English translation.

* cited by examiner

*Primary Examiner* — Roy M Punnoose
(74) *Attorney, Agent, or Firm* — Oblon, Spivak, McClelland, Maier & Neustadt, L.L.P.

(57) ABSTRACT

A defect to be reviewed is selected from a plurality of defects obtained from inspection results. When the selected defect is a defect of a pattern written using an iteration expression in design data on the mask, another pattern written using the iteration expression in the design data is extracted. A defect present in another pattern is extracted. A peripheral pattern portion located at the periphery of the selected defect and a peripheral pattern portion located at the periphery of the extracted defect are extracted. It is determined whether the peripheral pattern portions extracted are similar to each other. When the peripheral pattern portions are similar to each other, the selected defect and the extracted defect are grouped. It is determined whether the selected defect is an actual defect or a pseudo defect. The determination result is applied to the other grouped defect.

10 Claims, 6 Drawing Sheets

Defect list

| ID | Position(x,y) |
|---|---|
| 1 | (1990,2000) |
| 2 | (2095,2190) |
| ⋮ | ⋮ |

METHOD AND APPARATUS FOR REVIEWING DEFECTS ON MASK

BACKGROUND OF THE INVENTION

1. Field of the Invention

The present invention relates to a method and apparatus for reviewing defects on a mask.

2. Background Art

In a process for manufacturing a semiconductor device, a reticle or photomask (hereinafter referred to as a mask) is used to form a circuit pattern on a wafer. When the mask has a defect, the defect is transferred to the circuit pattern. Thus, the mask needs to be defectless. In response to such needs, defects on a formed mask are inspected by comparing an optical image of the mask with a standard image.

A die-to-die inspection and a die-to-database inspection are known in the art as a method for inspecting defects on a mask. In the die-to-die inspection, an optical image of a pattern that is written on a region of a mask and has a certain shape is compared with an optical image of a pattern that is written on another region of the mask and has the same shape. In this case, one of the optical images is regarded as a standard image. That is, a difference between the standard image and the other optical image is compared and detected. Therefore, a defect detected by the die-to-die inspection also is included in defects detected by comparing the standard image with the other optical image. By contrast, in the die-to-database inspection, a reference image (standard image) created based on design data (CAD data) used to form a mask is compared with an optical image of a pattern written on the mask.

It is known that an operator performs mask inspection review (hereinafter abbreviated to review) to finally determine as to whether a defect detected by comparing an optical image with a standard image is an actual defect or a pseudo defect (for example, Japanese Patent Laid-open No. 2005-134347).

The term pseudo defect device those not determined to be actually defective among the results detected as a defect by a mask inspection apparatus. The pseudo defect may be generated due to malfunctioning of the mask inspection apparatus, distortion on the surface of the mask, or a variation in an environment (temperature, humidity, atmospheric pressure, etc.) during the inspection of the mask.

With higher integration of semiconductor devices and smaller sizes of the semiconductor devices in recent years, the amount of design data used to form a mask tends to be increased. To reduce the amount of the design data, there has been proposed a design data format using an iteration expression to write patterns that have the same shape with each other and are placed at respective different locations. According to the design data format, the shape of the patterns and information on the locations at which the patterns are to be written are defined.

In an optical image of a mask created based on the design data using the iteration expression to write the patterns, four patterns 10 having the same shape are arranged at a pitch P1 as shown in FIG. 4. It should be noted that rectangular patterns shown in FIG. 4 are not written using the iteration expression in the design data.

As a result of a comparison by a mask inspection apparatus that compares the optical image with a standard image, if defects Da, Db and Dd are each detected at or near a corresponding respective location in three of the four patterns 10, as shown in FIG. 4, there is high expectation that review results of the Da, Db and Dd are the same.

In review described in Japanese Patent Laid-open No. 2005-134347, detailed review is performed to determine whether each of all defects detected by the comparisons is an actual defect or a pseudo defect. Thus, it takes much time to complete the review.

SUMMARY OF THE INVENTION

It is, therefore, an object of the present invention to provide a method and apparatus which are capable of reducing a review time for reviewing defects on a mask.

Other challenges and advantages of the present invention are apparent from the following description.

According to one aspect of the present invention, in a method for reviewing defects on a mask, a plurality of defects are detected obtained by comparing a standard image with an optical image of the mask on which a pattern is written. A plurality of patterns are extracted written using an iteration expression in design data on the mask. From among the plurality of defects detected, at least two or more defects are extracted each present at or near a corresponding respective location in the patterns extracted. The defects extracted are grouped thus. A judgment is made as to whether any one of the grouped defects is an actual defect or a pseudo defect, and the result of the judgment is applied to other defects belonging to the grouped defects.

According to another aspect of the present invention, in a method for reviewing defects on a mask, a plurality of defects are detected obtained by comparing a standard image with an optical image of the mask on which a pattern is written. A plurality of patterns are extracted that conform to a predetermined alignment rule in design data on the mask, the plurality of patterns having shapes that are the same or similar to each other. From among the plurality of defects detected, at least two or more defects are extracted each present at or near a corresponding respective location in the patterns extracted. The defects extracted are grouped thus. A judgment is made as to whether any one of the grouped defects is an actual defect or a pseudo defect, and the result of the judgment is applied to other defects belonging to the grouped defects.

According to other aspect of the present invention, an apparatus for reviewing defects on a mask comprises device for detecting a plurality of defects obtained from the results of comparison of a standard image with an optical image of the mask on which a pattern is written, device for extracting a plurality of patterns written using an iteration expression in design data on the mask, device for extracting, from among the plurality of defects detected by the defect detecting device, at least two or more defects each present at or near a corresponding respective location in the patterns extracted by the pattern extracting device, device for grouping the defects extracted by the defect extracting device, and device for making a judgment as to whether anyone of the defects grouped by the grouping device is an actual defect or a pseudo defect and applying the result of the judgment to other defects belonging to the grouped defects.

According to other aspect of the present invention, an apparatus for reviewing defects on a mask comprises device for detecting a plurality of defects obtained from the results of comparison of a standard image with an optical image of the mask on which a pattern is written, device for extracting a plurality of patterns that conform to a predetermined alignment rule in design data, the plurality of patterns having shapes that are the same or similar to each other, device for extracting, from among the plurality of defects detected by the defect detecting device, at least two or more defects each present at or near a corresponding respective location in the patterns extracted by the pattern extracting device, device for grouping the defects extracted by the defect extracting device, and device for making a judgment as to whether any one of the defects grouped by the grouping device is an actual defect or a pseudo defect and applying the result of the judgment to other defects belonging to the grouped defects.

According to the present invention, the "near" when a defect is extracted in a defect extracting step and by defect extracting device, can be optionally set.

DETAILED DESCRIPTION OF THE EMBODIMENTS

Figure 1:
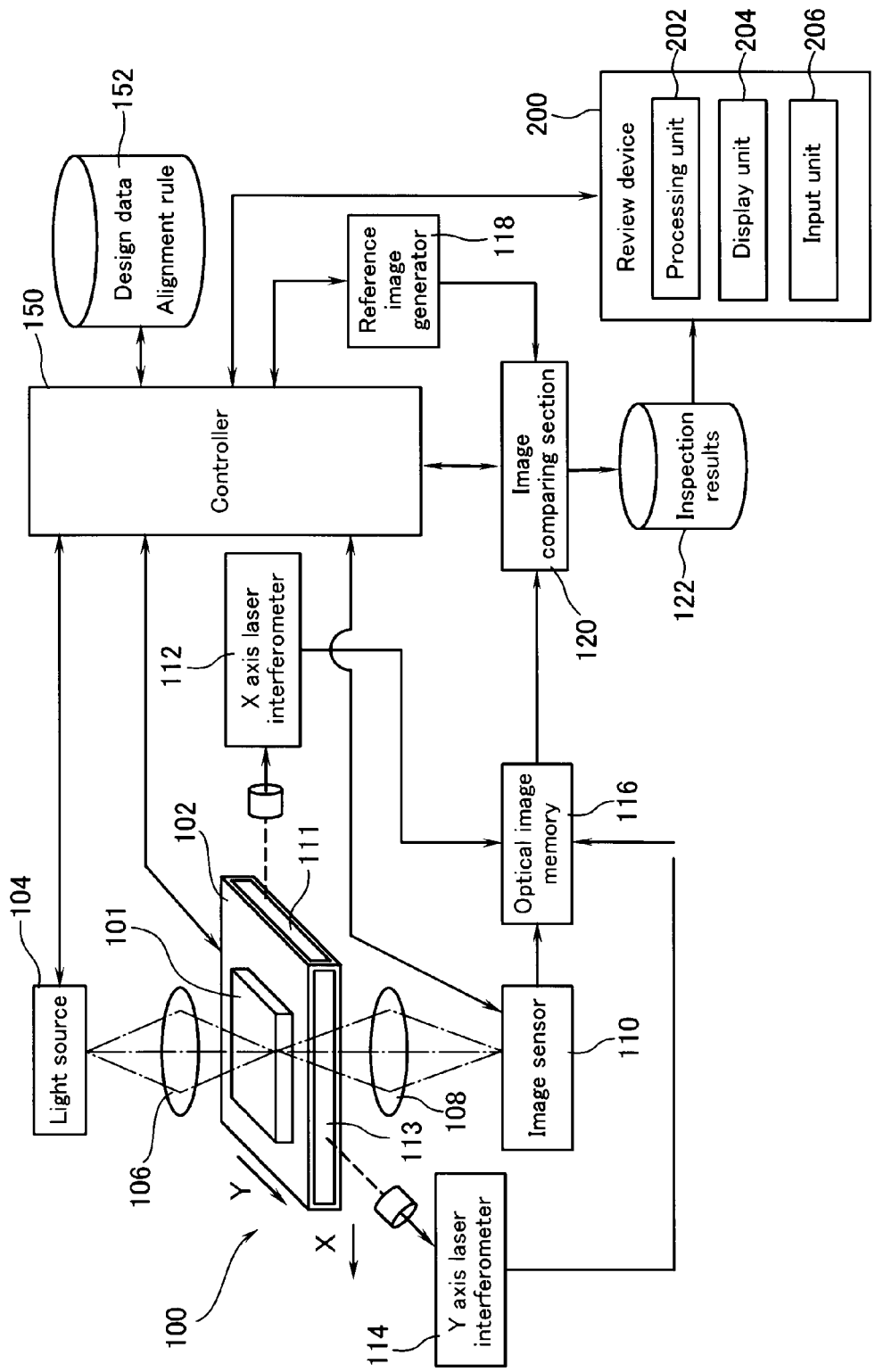
FIG. 1 is an outline diagram showing the configuration of a mask inspection apparatus according to an embodiment of the present invention.

FIG. 1 is an outline diagram showing the configuration of a mask inspection apparatus 100 according to an embodiment of the present invention. The mask inspection apparatus 100 has a stage 102 for holding a mask 101 that is to be inspected.

The stage 102 can be driven by a motor (not shown) in an X direction and a Y direction. A controller 150 controls and drives the stage 102. The controller 150 performs entire control related to an inspection of a mask.

A mirror 111 is provided on a side surface of the stage 102, and the side surface being parallel to the Y direction. A mirror 113 is provided on another side surface of the stage, and the side surface being parallel to the X direction. An X axis laser interferometer 112 facing the mirror 111, and a Y axis laser interferometer 113 facing the mirror 113 are provided.

The X axis laser interferometers 112, 114 emit laser beams to the mirror 111, 113 and receive lights reflected on the mirror 111, 113, respectively. Thus, the X axis laser interferometer 112 can measure the position of the stage 102 in the X direction by receiving the light reflected on the mirror 111, and the Y axis laser interferometer 114 can measure the position of the stage 102 in the Y direction by receiving the light reflected on the mirror 113.

The X axis laser interferometer 112 and the Y axis laser interferometer 114 transmit the measurement results to an optical image memory 116 that is used to store an optical image.

The mask inspection apparatus 100 has a light source 104 that emits a laser beam. The laser beam emitted by the light source 104 passes through a transmission illumination optical system (e.g., collector lens) 106. The mask 101 is then irradiated with the laser beam.

The laser beam then passes through the mask 101 and an objective lens 108. Then, the laser beam reaches an image sensor 110, and an image is formed on the image sensor 110. The image sensor 110 is, for example, a TDI sensor having an imaging area with 2048 pixels by 512 pixels. The size of one pixel is 70 nanometers×70 nanometers in terms of a mask surface.

The image sensor 110 has lines arranged at multiple stages (e.g., 512 stages) in a TDI direction (charge accumulation direction), although the lines are not shown in FIG. 1. Each of the lines includes multiple pixels (e.g., 2048 pixels) arranged in a direction perpendicular to the TDI direction. The image sensor 110 is configured such that accumulated charges are capable of two-way output.

The image sensor 110 is placed such that the TDI direction is the same as the X direction of the stage 102. When the stage 102 moves in the X direction, the image sensor 110 moves relative to the mask 101. Thus, the image sensor 110 images a pattern of the mask 101 (refer to FIG. 2).

Data (optical image) output from the image sensor 110 for one line of the image sensor 110 is amplified by an amplifier (not shown). After the amplification, the output data is stored in the optical image memory 116. In this case, the optical image is associated with the position (measured by the X axis laser interferometer 112) of the stage 102 in the X direction and the position (measured by the Y axis laser interferometer 112) of the stage 102 in the Y direction, and stored in the optical image memory 116.

Figures 2, 3:
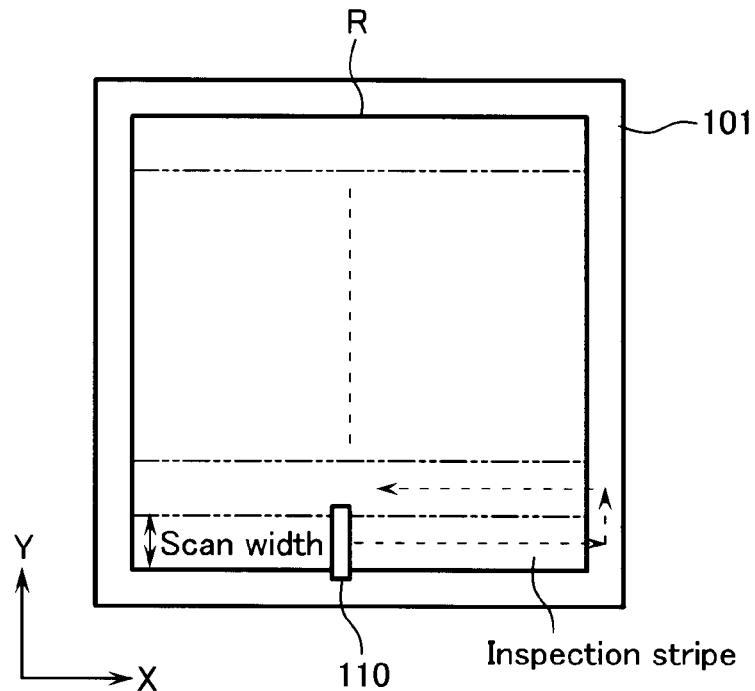
FIG. 2 is an outline diagram explaining of a region to be inspected and inspection stripes.
FIG. 3 is an outline diagram showing a defect list that is the comparison result.

As shown in FIG. 2, a symbol R of the mask 101 indicates a region to be inspected. The region R to be inspected is virtually divided into multiple rectangular inspection stripes in the Y direction. The width of each of the inspection stripes is set based on the length of each of the lines of the image sensor 110.

The image sensor 110 images an optical image of one of the virtually divided inspection stripes, while the stage 102 holding the mask 101 continuously moves in the X direction from one side to the other side of the region R. When the image sensor 110 reaches an end of the inspection stripe, the stage 102 performs a step movement in the Y direction. Then, the image sensor 110 images an optical image of the next inspection stripe, while the stage 102 continuously moves in the X direction from the other side to the one side of the region R.

The optical image of one inspection stripe is stored in the optical image memory 116, and is then input to an image comparing section 120.

The mask inspection apparatus 100 shown in FIG. 1 has a reference image generator 118. The reference image generator 118 generates a reference image for the mask 101 as a standard image based on design data (CAD data) that is stored in a storage device 152 and used to form the mask 101. The reference image (for the mask 101) generated by the reference image generator 118 is input to the image comparing section 120.

The storage device 152 Stores data on a predetermined alignment rule (coordinates of patterns) described later and the design data on the mask 101.

The image comparing section 120 compares the optical image received from the optical image memory 116 with the reference image received from the reference image generator 118 for each inspection stripe. The image comparing section 120 outputs a difference between the optical image and the reference image as a defect. The image comparing section 120 generates a defect list as the comparison results (inspection results) as shown in FIG. 3, for example. The defect list including a plurality of defects and coordinates of the defects and the optical images are stored in the storage device 122.

The mask inspection apparatus 100 shown in FIG. 1 also has a review device 200. The review device 200 performs review by finally determining whether each of the defects that are the comparison results obtained by the image comparing section 120 is an actual defect or a pseudo defect.

The review device 200 has a processing unit 202, a display unit 204 and an input unit 206. The processing unit 202 performs entire control related to the review, that is, performs a control routine (described later) shown in FIG. 10.

The display unit 204 is a monitor for displaying the defect list shown in FIG. 3 and an optical image showing a periphery of a defect listed in the defect list. The input unit 206 is a keyboard or the like for selecting a defect (that is to be reviewed) from the defect list displayed on the display unit 204 and inputting data indicating whether a defect displayed on the display unit 204 is an actual defect or a pseudo defect.

With higher integration of semiconductor devices and smaller sizes of the semiconductor devices in recent years, the amount of design data used to form a mask tends to be increased. As a result, such disadvantages arise that the capacity of the storage device 152 which stores design data and is provided in a mask inspection apparatus 100 increases, and that the time for transferring data from the storage device 152 to the reference image generator 118 increases.

In order to avoid the disadvantages, a design data format (e.g., OASIS (registered trademark) format) that uses an iteration expression to write a plurality of patterns having the same shape is known.

Figure 4:
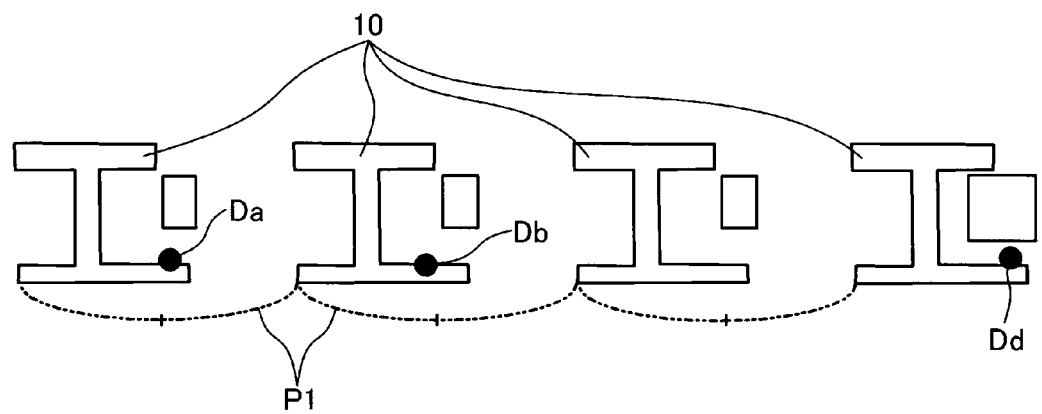
FIG. 4 is an outline diagram showing defects in an optical image of patterns written using iteration expression.

In an example (shown in FIG. 4) of the optical image, four patterns 10 are arranged at a pitch P1. Each of the four patterns 10 has a turned H shape and is written using an iteration expression in design data. The optical image shown in FIG. 4 is compared with the standard image. As a result of the comparison, three defects Da, Db and Dd are each detected at or near a corresponding respective location in three of the four patterns 10. As the shapes, sizes, types and the like of the defects Da, Db and Dd are in common with each other with high possibility, there is high expectation that review results of the defects are in common with each other.

In the conventional review method described in Japanese Patent Laid-open No. 2005-134347, however, as all defects are reviewed in detail, it takes much time to review all the defects.

A method according to the present embodiment is to group at least two or more defects that each are present at or near a corresponding respective location in a plurality of patterns written using an iteration expression in design data, review one of the grouped defects, and apply the review result to the other grouped defects. In the method according to the present embodiment, the review time can be reduced compared with the conventional review method.

In the example shown in FIG. 4, the defects Da, Db and Dd are grouped. The defects Da, Db and Dd are each present at or near a corresponding respective location in the plurality of patterns 10 written using the interval expression in the design data. For example, the defect Da is first reviewed and the review result of the defect Da is applied to the defects Db and Dd. Thus, it is not necessary to review the defects Db and Dd in detail, and the review time can be reduced.

Figure 5:
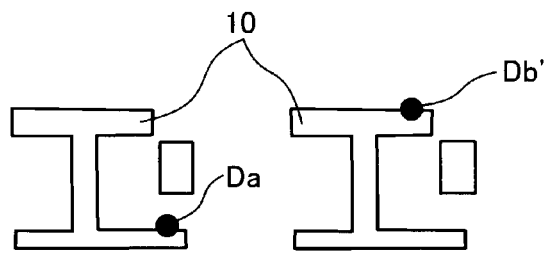
FIG. 5 is an outline diagram showing that a position of the defect present in a certain region of the pattern and a position of a defect present in a certain region of the other pattern are different from each other, that their patterns are written using iteration expression

Referring to FIG. 5, a position of the defect Da present in a certain region of the pattern 10 and a position of a defect Db' present in a certain region of the other pattern 10 are significantly different from each other. As there is not high possibility that review results of the defects Da and Db' are in common with each other, unlike the review results of the defects Da, Db and Dd, it is not desirable to group the defects Da and Db'.

To group defects, portions (hereinafter referred to as peripheral pattern portions) of patterns, which are located at the peripheries of the defects, are clipped, determination is made as to whether or not the peripheral pattern portions are similar to each other, and then it is determined whether or not the defects are each present at or near a corresponding respective location in the patterns.

Figure 6:
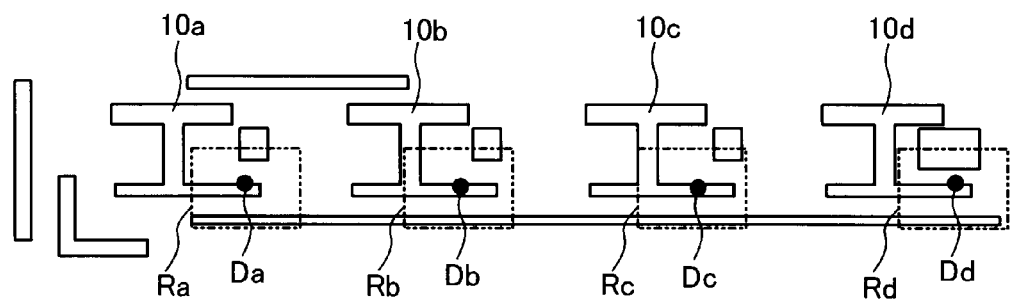
FIG. 6 is an outline diagram showing extraction of patterns, which are located at the peripheries of the defects.

Specifically, as shown in FIG. 6, pattern regions Ra to Rd having a predetermined size in which the defects Da to Dd are present at the centers of the regions are clipped from the optical image or design data. The size of the pattern regions can be set based on the size of the patterns 10 written using the interval expression. Specifically, the size of the pattern regions Ra to Rd can be set such that it is determined whether or not the peripheral pattern portions are similar to each other.

Figure 7:
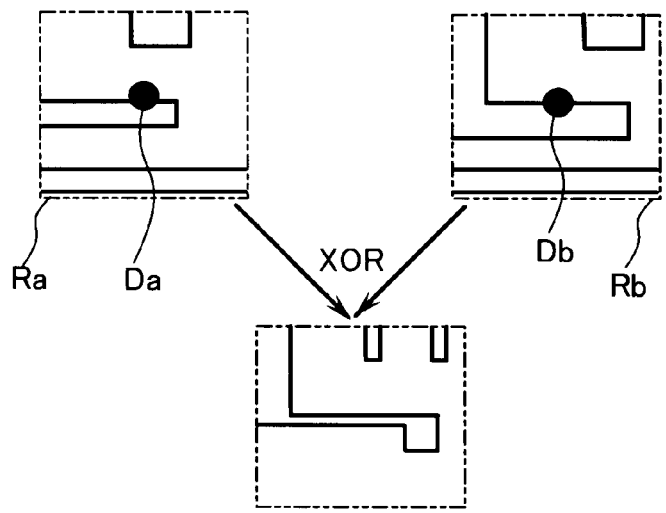
FIG. 7 is an outline diagram of showing calculation results by an exclusive OR of patterns extracted.

Referring to FIG. 7, the exclusive OR (XOR) of the pattern regions Ra and Rb is calculated, for example, and it is determined whether or not the peripheral pattern portions are similar to each other based on the calculated XOR. The XOR is a difference between the peripheral pattern portions clipped. Therefore, when the area of the difference is smaller than a reference value, it can be determined that the peripheral pattern portions are similar to each other. In this case, it can be determined that the defects are each present at or near a corresponding respective location in the patterns written using the iteration expression in the design data.

It is known that an optical proximity effect occurs due to miniaturization of patterns in recent years. To take measures against the optical proximity effect, an optical proximity correction (OPC) is performed on the design data. The design data subjected to the optical proximity correction is input to the mask inspection apparatus 100 and stored in the storage device 152.

Figure 8:
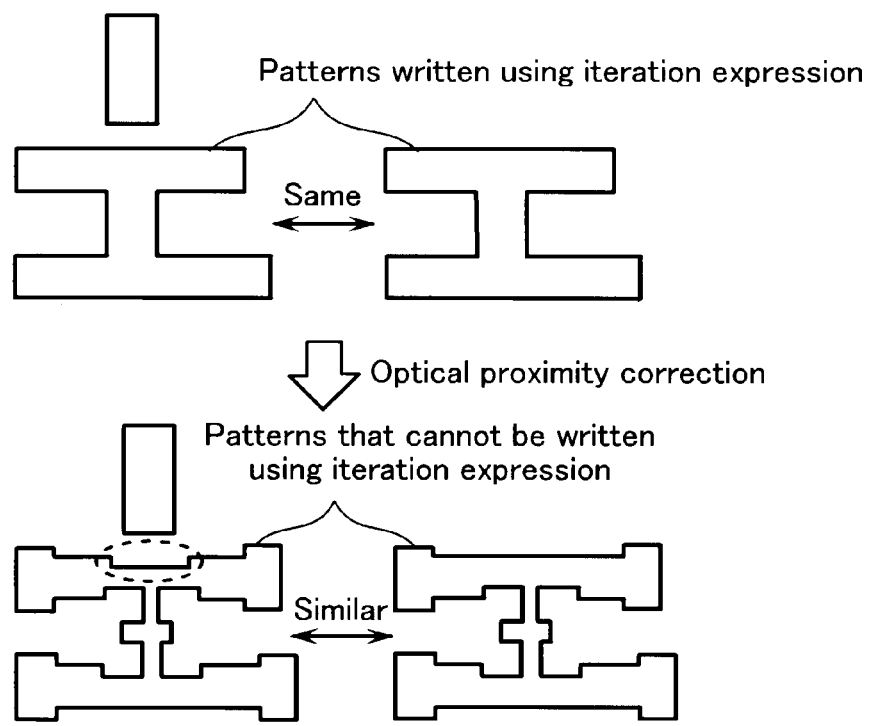
FIG. 8 is an outline diagram explaining an example of patterns that cannot be written using iteration expression because of optical proximity correction.

FIG. 8 shows a change of the pattern included in the design data subjected to the optical proximity correction.

As shown in FIG. 8, the patterns having turned H shapes are written using the iteration expression in the design data that is not subjected to the optical proximity correction. A portion (surrounded by a broken line shown in FIG. 8) of the pattern written in the design data subjected to the optical proximity correction is different from the original portion of the pattern written in the design data that is not subjected to the optical proximity correction. Thus, the shapes of the patterns written in the design data are similar to each other and not the same. Those patterns cannot be written using the iteration expression in the design data.

Even when the plurality of patterns cannot be written using the iteration expression in the design data due to the optical proximity correction or the like, the plurality of patterns having similar shapes may conform to a predetermined alignment rule. In this case, there is high possibility that review results of the defects each present at or near a corresponding respective location in the plurality of patterns are in common with each other, and it is preferable to group the defects.

As the predetermined alignment rule, an alignment rule defined by SEMI P39-1105 Open Artwork System Interchange Standard (OASIS) can be used, for example.

In the present embodiment, the two or more defects which are each present at or near a corresponding respective location in the patterns that conform to the predetermined alignment rule and have the same shapes or similar shapes are grouped. After that, the review result of one of the grouped defects is applied to other defects belonging to the grouped defects.

Figure 9:
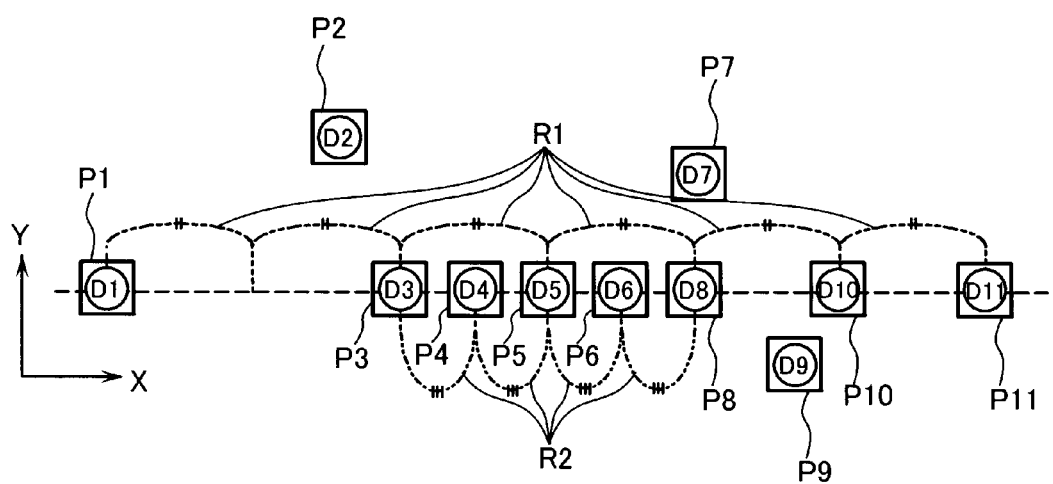
FIG. 9 is an outline diagram showing patterns and defects having of predetermined alignment rule.

In an example shown in FIG. 9, when a defect D1 is selected as a target to be reviewed, the selected defect D1 included in a pattern P1 and defects D3, D5, D8, D10 and D11 included in patterns P3, P5, P8, P10 and P11 respectively are grouped. The defects D3, D5, D8, D10 and D11 are each present at or near a corresponding respective location in the patterns P3, P5, P8, P10 and P11. The patterns P1, P3, P5, P8, P10 and P11 conform to a predetermined alignment rule R1. Since the defects D1, D3, D5, D8, D10 and D11 are grouped, it is not necessary to review the defects D3, D5, D8, D10 and D11 in detail. Thus, the review time can be reduced.

In the example shown in FIG. 9, when the defect D3 is selected as a target to be reviewed, the selected defect D3 included in a pattern P3 and the defects D4, D5, D6 and D8 included in patterns P4, P5, P6 and P8 respectively are grouped. The defects D4, D5, D6, and D8 are each present at or near a corresponding respective location in the patterns P4, P5, P6 and P8. The patterns P3, P4, P5, P6, and P8 conform to a predetermined alignment rule R2. Since the defects D3, D4, D5, D6 and D8 are grouped, it is not necessary to review the defects D4, D5, D6 and D8 in detail. Thus, the review time can be reduced.

It is assumed that the shapes of the patterns P1 to P11 in which the defects D1 to D11 shown in FIG. 9 are present are the same as or similar to each other. Since the defects D2, D7 and D9 are not grouped in the example shown in FIG. 9, the defects D2, D7 and D9 are reviewed in detail.

Figure 10:
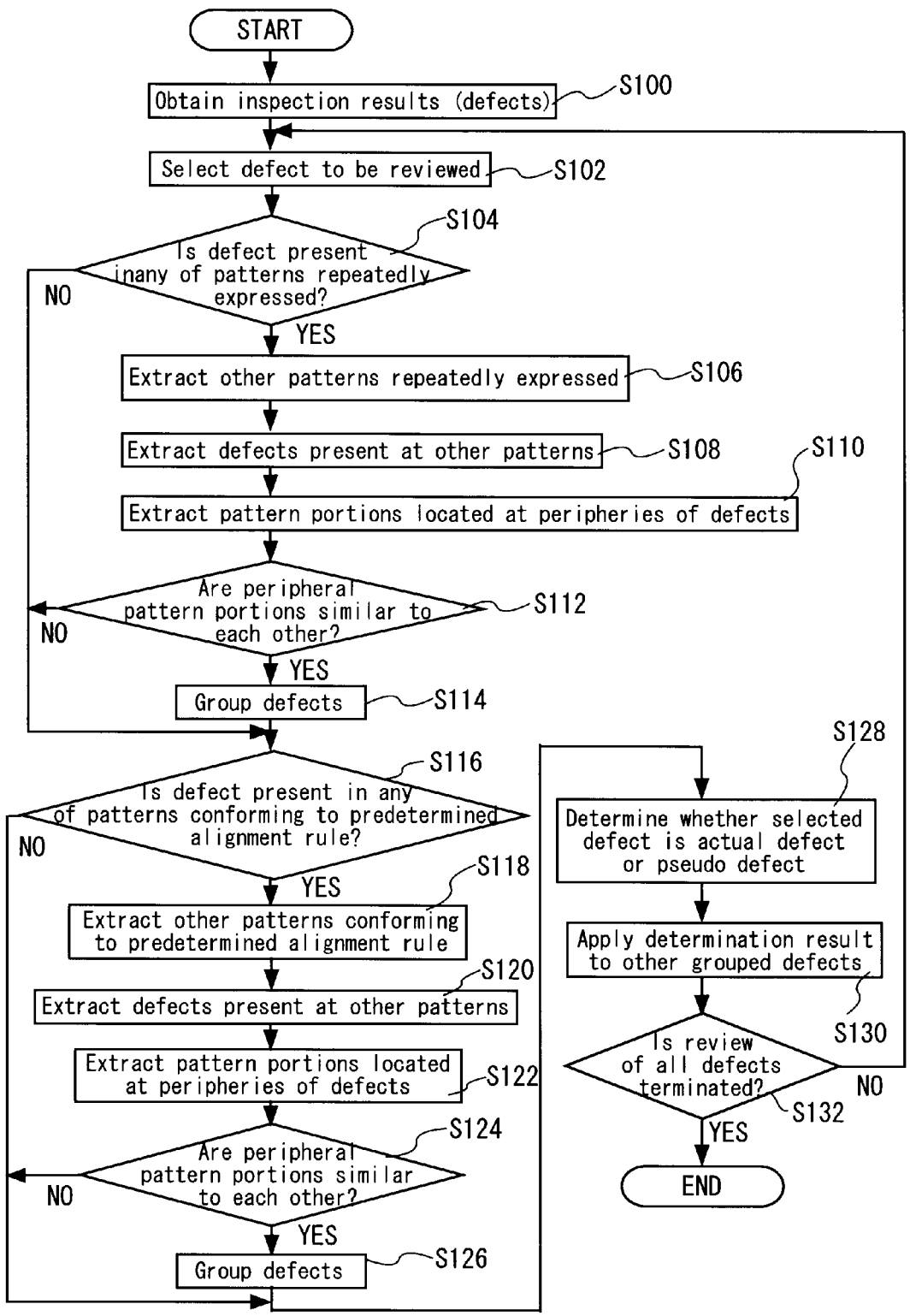
FIG. 10 is a flowchart showing a method for reviewing defects on a mask.

The following describes in detail a method for reviewing defects on a mask, according to the present embodiment with reference to FIG. 10. FIG. 10 is a flowchart of the method for reviewing defects on a mask according to the present embodiment. A routine shown in FIG. 10 is activated by the processing unit 202 included in the review device 200. The routine may be activated by the controller 150.

In the routine shown in FIG. 10, a plurality of defects are obtained from inspection results in step S100 by comparing the optical image of the mask with the standard image (e.g., reference image). In step S100, the inspection results stored in the storage device 122 are read. Specifically, as shown in FIG. 3, the defect list including information (X and Y coordinates) indicative of the positions of the plurality of defects is read.

Then, a defect to be reviewed is selected in step S102 from the plurality of defects obtained in step S100. In step S102, the defect list is displayed on the display unit 204, and an operator enters an ID of the defect to be reviewed among the defects included in the defect list.

It is determined whether or not the defect selected in step S102 is present in any of patterns written using an iteration expression in design data, in step S104. In step S104, it is determined whether or not the pattern in which the defect is present is one of the patterns written using the iteration expression in the design data based on the design data read from the storage device 152.

When it is determined in step S104 that the defect selected in step S102 is not present at any of the patterns written using the iteration expression in the design data, the process shown in FIG. 10 proceeds to step S116. It is determined in step S104 that a defect of a pattern whose shape is changed in the design data subjected to the optical proximity correction as shown in FIG. 8 is not present in any of the patterns written using the iteration expression in the design data.

On the other hand, when it is determined in step S104 that the defect is present in any of the patterns written using the iteration expression in the design data, the other patterns written using the iteration expression in the design data are extracted in step S106. In the example shown in FIG. 6, when it is determined in step S104 that the defect Da is present in any of the patterns written using the iteration expression in the design data, the three patterns 10b, 10c and 10d (other than the pattern 10a) are extracted.

Then, defects present in the other patterns extracted in step S106 are extracted in step S108. In step S108, the defects Db, Dc and Dd (shown in FIG. 6) present in the three patterns 10b, 10c and 10d respectively are extracted from the defect list shown in FIG. 3.

A peripheral pattern portion which is located at the periphery of the defect selected in step S102, and peripheral pattern portions which are respectively located at the peripheries of the defects extracted in step S108, are extracted in step S110. In step S110, the pattern portions present in the regions Ra to Rd (shown in FIG. 6) in which the defects Da to Dd are present at the centers of the regions are clipped.

The peripheral pattern portions may be clipped from the optical image or from the design data in step S110.

Then, it is determined whether or not the peripheral pattern portions extracted in step S110 are similar to each other in step S112. In step S112, it is determined whether or not the plurality of defects are each present at or near a corresponding respective location in the patterns written using the iteration expression in the design data.

In the example shown in FIG. 6, it is determined whether or not the pattern portion located in the region Ra is similar to those located in the regions Rb, Rc and Rd. For example, to determine whether or not the peripheral pattern portion located in the region Ra in which the defect Da is present is similar to that located in the region Rb in which the defect Db is present, the XOR of (difference between) the peripheral pattern portion located in the region Ra in which the defect Da is present and that located in the region Rb in which the defect Db is present is calculated. Based on the calculated XOR, it is determined whether or not the peripheral pattern portion located in the region Ra in which the defect Da is present is similar to that located in the region Rb in which the defect Db is present. Specifically, when the calculated XOR is equal to or less than a reference value, it is determined that the peripheral pattern portion located in the region Ra in which the defect Da is present is similar to that located in the region Rb in which the defect Db is present. As a result, it is determined that the defects Da and Db are each present at or near a corresponding respective location in the patterns 10a and 10b.

When it is determined that the pattern portions present at the peripheries of the defects are similar to each other, or when it is determined that the defects are each present at or near a corresponding respective location in the patterns written using the iteration expression in the design data, the defect selected in step S102 and the defects extracted in step S108 are grouped in step S114. In step S114, the defects Da and Db are grouped, for example. After that, the process proceeds to step S116.

When it is determined that the peripheral pattern portions are not similar to each other in step S112, for example, when the locations of the defects Da and Db' are significantly different from each other, the defects are not grouped. The process proceeds to step S116.

In step S116, it is determined whether or not the defect selected in step S102 is of a pattern that conforms to a predetermined alignment rule. This predetermined alignment rule is a rule defined by SEMI P39-1105 Open Artwork System Interchange Standard (OASIS), for example.

In step S116, it is determined whether or not the defect selected in step S102 is of the pattern conforming to the predetermined alignment rule, based on the design data and the alignment rule that are read from the storage device 152 and on information indicative of the position of the defect selected in step S102.

When it is determined that the defect is not of the pattern that conforms to the predetermined alignment rule in step S116, the defects are not grouped. The process proceeds to step S128.

When it is determined that the defect is of the pattern that conforms to the predetermined alignment rule in step S116, the other patterns conforming to the alignment rule are extracted in step S118. Then, defects present at the other patterns extracted in step S118 are extracted in step S120.

When the defect D1 shown in FIG. 9 is selected in step S102, the pattern P1 in which the defect D1 is present and the patterns P3, P5, P8, P10 and P11 that conform to the alignment rule R1 are extracted in step S118. After that, the defects D3, D5, D8, D10 and D11 are extracted from the defect list shown in FIG. 3 in step S120.

In the same way as step S110, the pattern portion present at the periphery of the defect selected in step S102 and the pattern portions present at the peripheries of the defects extracted in step S120 are extracted in step S122. Then, in the same way as step S112, it is determined whether or not the peripheral pattern portions extracted in step S122 are similar to each other in step S124. By performing step S124, it is determined whether or not the plurality of defects are each present at or near a corresponding respective location in the patterns that conform to the alignment rule.

When the peripheral pattern portions are not similar to each other in step S124, the defects are not grouped. The process shown in FIG. 10 proceeds to step S128.

When it is determined that the peripheral pattern portions are similar to each other in step S124, or when it is determined that the defects are each present at or near a corresponding respective location in the patterns conforming to the alignment rule in the design data, the defect selected in step S102 and the defects extracted in step S120 are grouped in step S126. After that, the process shown in FIG. 10 proceeds to step 128.

In step S128, the review is performed to prompt the operator to determine whether the defect selected in step S102 is an actual defect or a pseudo defect. Specifically, in step S128, as well as the display unit 204 displays an enlarged image of the defect, the apparatus prompts the operator to use the input unit 206 to enter whether the defect is an actual defect or a pseudo defect. The review result is reflected to a field of the selected defect among fields of the defect list.

After that, the process proceeds to step S130. In step S130, the result (i.e., review result) of the determination in step S128 is applied to the other defects grouped in steps S114 and S126. In step S130, the review result is reflected to the other defects included in the defect list.

Finally, it is determined whether or not review of all defects is completed in step S132. In step S132, it is determined whether or not the defect list includes a defect of which the review result is not provided. When it is determined that the review of all the defects is not completed in step S132, the process proceeds back to step S102.

When it is determined that the review of all the defects is completed in step S132, the routine is terminated.

In the present embodiment, the defects each present at or near a corresponding respective location in the patterns written using an interval expression in design data are grouped as described above, and then the review result of one of the grouped defects is applied to the other grouped defect or defects. Thus, it is not necessary to review the other defect(s) in detail, and the review time can be reduced.

In the present embodiment, the defects each present at or near a corresponding respective location in the patterns that conform to a predetermined alignment rule are grouped, and then the review result of one of the grouped defects is applied to the other grouped defect (s). Thus, the defects each present at or near a corresponding respective location in the patterns that cannot be written using the iteration expression in the design data due to an optical proximity correction or the like can be grouped.

In the present embodiment, portions of patterns, which are located at the peripheries of defects, are extracted in order to group the defects, and it is then determined whether or not the peripheral pattern portions are similar to each other. When it is determined that the peripheral pattern portions are similar to each other, it is determined that the defects are each present at or near a corresponding respective location in the patterns. The defects having high possibility of similarity in review results with each other can be grouped. Thus, the review time can be reduced, and accuracy of the review can be improved.

In the present embodiment, the processing unit 202 included in the review device 200 serves as "defect detecting device" according to the present invention by performing processing of step S100. The processing unit 202 also serves as "pattern extracting device" according to the present invention by performing processing of steps S104 and 5106 or processing of steps S116 and S118. The processing unit 202 also serves as "defect extracting device" according to the present invention by performing processing of steps S102 and S108 or processing of steps S102 and S120. The processing unit 202 also serves as "grouping device" according to the present invention by performing processing of steps S114 and S126. The processing unit 202 also serves as "determining device" according to the present invention by performing processing of steps S128 and S130.

The present invention is not limited to the aforementioned embodiment and may be modified in various ways without departing from the spirit of the present invention. In the present embodiment, the mask 101 is scanned by transmission illumination and an optical image is obtained. The present invention is not limited to this. An optical image may be obtained by device of reflection illumination or by device of both transmission illumination and reflection illumination.

In the present embodiment, the review device 200 is provided in the mask inspection device 100. The review device 200 may be provided outside the mask inspection device 100 and connected with the mask inspection device 100 via communication interfaces. That is, the review device 200 may perform off-line review.

In the routine shown in FIG. 10, the other patterns that conform to the alignment rule are extracted in step S118, and the defects present at the other extracted patterns are extracted in step S120. The following defects other than the defect selected in step S102 may be directly extracted without extraction of patterns: the defects having information on the position of the defect selected in step S102 and information on the positions of patterns that conform to a predetermined alignment rule.

Figure 11:
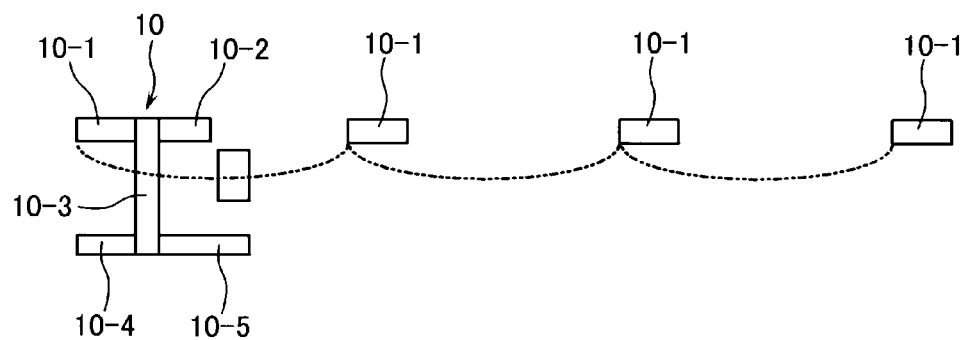
FIG. 11 is an outline diagram showing a case where portions of the pattern are written using iteration expression in the design data.

In the example shown in FIG. 4, the patterns 10 having the turned H shapes are written using the iteration expression in the design data. The present invention can be applied to the case where portions of the pattern 10 are written using the iteration expression in the design data as shown in FIG. 11. In the example shown in FIG. 11, the pattern 10 having the turned H shape consists of portions 10-1 to 10-5, and the pattern portions 10-1 are written using the iteration expression. As described in the embodiment, when at least two or more defects are detected from regions corresponding to each other in the portions 10-1 written using the iteration expression in the design data or from near the regions, the detected defects are grouped. Then, one of the grouped defects is reviewed, and the review result is applied to the other defects. Thus, the review time can be reduced.

The features and advantages of the present invention may be summarized as follows.

In a first aspect of the present invention, from a plurality of defects obtained by comparing an optical image on a mask with a standard image, at least two or more defects which are each present are at or near a corresponding respective location in patterns written using an iteration expression in design data on the mask, are extracted, and then the extracted defects are grouped. After that, whether one of the grouped defects is an actual defect or a pseudo defect is determined. The result of the determination is applied to the other grouped defect. According to the first aspect of the present invention, it is not necessary to perform review by determining whether the other grouped defect(s) is an actual defect or a pseudo defect. Thus, the review time can be reduced.

In a second aspect of the present invention, from a plurality of defects obtained by comparing an optical image on a mask with a standard image, at least two or more defects which are each present at or near a corresponding respective location in patterns that conform to a predetermined alignment rule in design data and have shapes that are the same as or similar to each other are extracted, and then, the extracted defects are grouped. Here, the patterns having the shapes that are the same as or similar to each other may be patterns subjected to an optical proximity correction. After that, whether one of the grouped defects is an actual defect or a pseudo defect is determined. The result of the determination is applied to the other grouped defect. According to the second aspect of the present invention, it is not necessary to perform review by determining whether the other grouped defect(s) is an actual defect or a pseudo defect. Thus, the review time can be reduced.

In a third aspect of the present invention, defect detecting device detects a plurality of defects obtained from the results of comparison of an optical image of a mask with a standard image, pattern extracting device extracts a plurality of patterns written using an interval expression in design data on a mask or extracts a plurality of patterns that conform to a predetermined alignment rule in the design data and that have shapes that are the same as or similar to each other, defect extracting device extracts, from the plurality of defects detected, at least two or more defects that are each present at or near a corresponding respective location in the patterns extracted, and grouping device groups the extracted defects. After that, determining device determines whether one of the grouped defects is an actual defect or a pseudo defect, and applies the result of the determination to the other grouped defect or defects. According to the third aspect of the present invention, it is not necessary to perform review by determining whether the other grouped defect(s) is an actual defect or a pseudo defect. Thus, the review time can be reduced.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-269469, filed on Oct. 20, 2008 including specification, claims, drawings and summary, on which the Convention priority of the present application is based, are incorporated herein by reference in its entirety.

What is claimed is:

1. A method for reviewing defects on a mask, comprising:
   detecting a plurality of defects obtained by comparing a standard image with an optical image of the mask on which a pattern is written;
   extracting a plurality of patterns written using an iteration expression in design data on the mask;
   extracting, from among the plurality of defects detected, at least two or more defects each present at or near a corresponding respective location in the patterns extracted;
   grouping the defects extracted thus; and
   making a judgment as to whether any one of the grouped defects is an actual defect or a pseudo defect and applying the result of the judgment to other defects belonging to the grouped defects.

2. The method according to claim 1, further including:
   clipping, from each of the plurality of patterns extracted, a peripheral pattern portion in which the defect is present, the peripheral pattern portion having a predetermined size; and
   determining whether or not the peripheral pattern portions clipped are similar to each other;
   wherein, when it is determined that the peripheral pattern portions are similar to each other, the defects are extracted as those present at or near a corresponding respective location in figures which form each of the extracted patterns.

3. A method for reviewing defects on a mask, comprising:
   detecting a plurality of defects obtained by comparing a standard image with an optical image of the mask on which a pattern is written;
   extracting a plurality of patterns that conform to a predetermined alignment rule in design data on the mask, the plurality of patterns having shapes that are the same or similar to each other;
   extracting, from among the plurality of defects detected, at least two or more defects each present at or near a corresponding respective location in the patterns extracted;
   grouping the defects extracted thus; and
   making a judgment as to whether any one of the grouped defects is an actual defect or a pseudo defect and applying the result of the judgment to other defects belonging to the grouped defects.

4. The method according to claim 3, further including:
   clipping, from each of the plurality of patterns extracted, a peripheral pattern portion in which the defect is present, the peripheral pattern portion having a predetermined size; and
   determining whether or not the peripheral pattern portions clipped are similar to each other;
   wherein, when it is determined that the peripheral pattern portions are similar to each other, the defects are extracted as those present at or near a corresponding respective location in figures which form each of the extracted patterns.

5. The method according to claim 3,
   wherein the extracted patterns whose shapes are the same or similar to each other are written in a data format allowing the extracted patterns to be input to a mask inspection apparatus that compares the optical image with the standard image.

6. The method according to claim 5, further including:

clipping, from each of the plurality of patterns extracted, a peripheral pattern portion in which the defect is present, the peripheral pattern portion having a predetermined size; and determining whether or not the peripheral pattern portions clipped are similar to each other;

wherein, when it is determined that the peripheral pattern portions are similar to each other, the defects are extracted as those present at or near a corresponding respective location in figures which form each of the extracted patterns.

7. The method according to claim 3, further including:

clipping, from each of the plurality of patterns extracted, a peripheral pattern portion in which the defect is present, the peripheral pattern portion having a predetermined size; and determining whether or not the peripheral pattern portions clipped are similar to each other;

wherein, when it is not determined that the peripheral pattern portions are similar to each other, a judgment as to whether the defect is an actual defect or a pseudo defect is made.

8. The method according to claim 7, wherein the result of the judgment is applied to other defects belonging to the grouped defects.

9. An apparatus for reviewing defects on a mask, comprising:

device for detecting a plurality of defects obtained from the results of comparison of a standard image with an optical image of the mask on which a pattern is written;

device for extracting a plurality of patterns written using an iteration expression in design data on the mask;

device for extracting, from among the plurality of defects detected by the defect detecting device, at least two or more defects each present at or near a corresponding respective location in the patterns extracted by the pattern extracting device;

device for grouping the defects extracted by the defect extracting device; and device for making a judgment as to whether any one of the defects grouped by the grouping device is an actual defect or a pseudo defect and applying the result of the judgment to other defects belonging to the grouped defects.

10. An apparatus for reviewing defects on a mask, comprising:

device for detecting a plurality of defects obtained from the results of comparison of a standard image with an optical image of the mask on which a pattern is written;

device for extracting a plurality of patterns that conform to a predetermined alignment rule in design data, the plurality of patterns having shapes that are the same or similar to each other;

device for extracting, from among the plurality of defects detected by the defect detecting device, at least two or more defects each present at or near a corresponding respective location in the patterns extracted by the pattern extracting device;

device for grouping the defects extracted by the defect extracting device; and device for making a judgment as to whether any one of the defects grouped by the grouping device is an actual defect or a pseudo defect and applying the result of the judgment to other defects belonging to the grouped defects.

* * * * *